(12) United States Patent
Röer et al.

(10) Patent No.: US 10,236,737 B2
(45) Date of Patent: Mar. 19, 2019

(54) SYNCHRONOUS GENERATOR, IN PARTICULAR MULTIPOLE SYNCHRONOUS ANNULAR GENERATOR OF A DIRECT-DRIVE WIND TURBINE, AND WIND TURBINE HAVING THE SAME

(71) Applicant: WOBBEN PROPERTIES GMBH, Aurich (DE)

(72) Inventors: Jochen Röer, Ganderkesee (DE); Falk Middelstädt, Berlin (DE)

(73) Assignee: Wobben Properties GmbH, Aurich (DE)

( * ) Notice: Subject to any disclaimer, the term of this patent is extended or adjusted under 35 U.S.C. 154(b) by 118 days.

(21) Appl. No.: 15/501,430

(22) PCT Filed: Jul. 20, 2015

(86) PCT No.: PCT/EP2015/066569
§ 371 (c)(1),
(2) Date: Feb. 2, 2017

(87) PCT Pub. No.: WO2016/023710
PCT Pub. Date: Feb. 18, 2016

(65) Prior Publication Data
US 2017/0229935 A1 Aug. 10, 2017

(30) Foreign Application Priority Data
Aug. 14, 2014 (DE) .................... 10 2014 216 148

(51) Int. Cl.
*H02K 9/00* (2006.01)
*H02K 3/24* (2006.01)
*H02K 9/19* (2006.01)
*H02K 3/12* (2006.01)
*H02K 7/18* (2006.01)
*H02K 1/20* (2006.01)

(52) U.S. Cl.
CPC ............. *H02K 3/24* (2013.01); *H02K 9/19* (2013.01); *H02K 1/20* (2013.01); *H02K 3/12* (2013.01); *H02K 7/1838* (2013.01)

(58) Field of Classification Search
CPC ............ H02K 3/24; H02K 1/20; H02K 9/19
USPC ........................... 310/52, 54, 58, 64
See application file for complete search history.

(56) References Cited

U.S. PATENT DOCUMENTS

| 5,642,013 A | 6/1997 | Wavre |
| 7,242,119 B2 | 7/2007 | Gomes De Lima |

(Continued)

FOREIGN PATENT DOCUMENTS

| CH | 357797 | 10/1961 |
| CH | 475663 | 7/1969 |

(Continued)

*Primary Examiner* — Hanh N Nguyen
(74) *Attorney, Agent, or Firm* — Seed Intellectual Property Law Group LLP

(57) ABSTRACT

A synchronous generator, in particular a multipole synchronous annular generator of a direct-drive wind turbine, for generating electricity, with a rotor and a stator, wherein the stator has multiple grooves in which a stator winding is arranged, wherein the stator winding releases heat energy as a result of the generation of power, and wherein a cooling body for absorbing and dissipating released heat energy is arranged in one groove, multiple grooves or all of the grooves.

13 Claims, 3 Drawing Sheets

(56) References Cited

U.S. PATENT DOCUMENTS

| | | | |
|---|---|---|---|
| 2005/0200212 A1* | 9/2005 | Lima | H02K 1/20 |
| | | | 310/59 |
| 2005/0285451 A1 | 12/2005 | Kubo et al. | |
| 2006/0163954 A1* | 7/2006 | Biais | H02K 1/16 |
| | | | 310/54 |
| 2008/0197724 A1* | 8/2008 | Cullen | H02K 3/24 |
| | | | 310/53 |
| 2010/0102651 A1 | 4/2010 | Möhle et al. | |
| 2012/0228969 A1* | 9/2012 | Kimiabeigi | H02K 3/24 |
| | | | 310/59 |
| 2014/0015352 A1* | 1/2014 | Marvin | H02K 3/12 |
| | | | 310/54 |
| 2014/0175802 A1 | 6/2014 | Taniyama et al. | |

FOREIGN PATENT DOCUMENTS

| | | | |
|---|---|---|---|
| CN | 1163682 | A | 10/1997 |
| CN | 2427922 | Y | 4/2001 |
| DE | 964161 | | 5/1957 |
| DE | 10244202 | A1 | 3/2004 |
| EP | 2182570 | A1 | 5/2010 |
| EP | 2752578 | A1 | 7/2014 |
| GB | 643890 | A | 9/1950 |
| GB | 2403605 | A | 1/2005 |
| JP | 63-274336 | A | 11/1988 |

\* cited by examiner

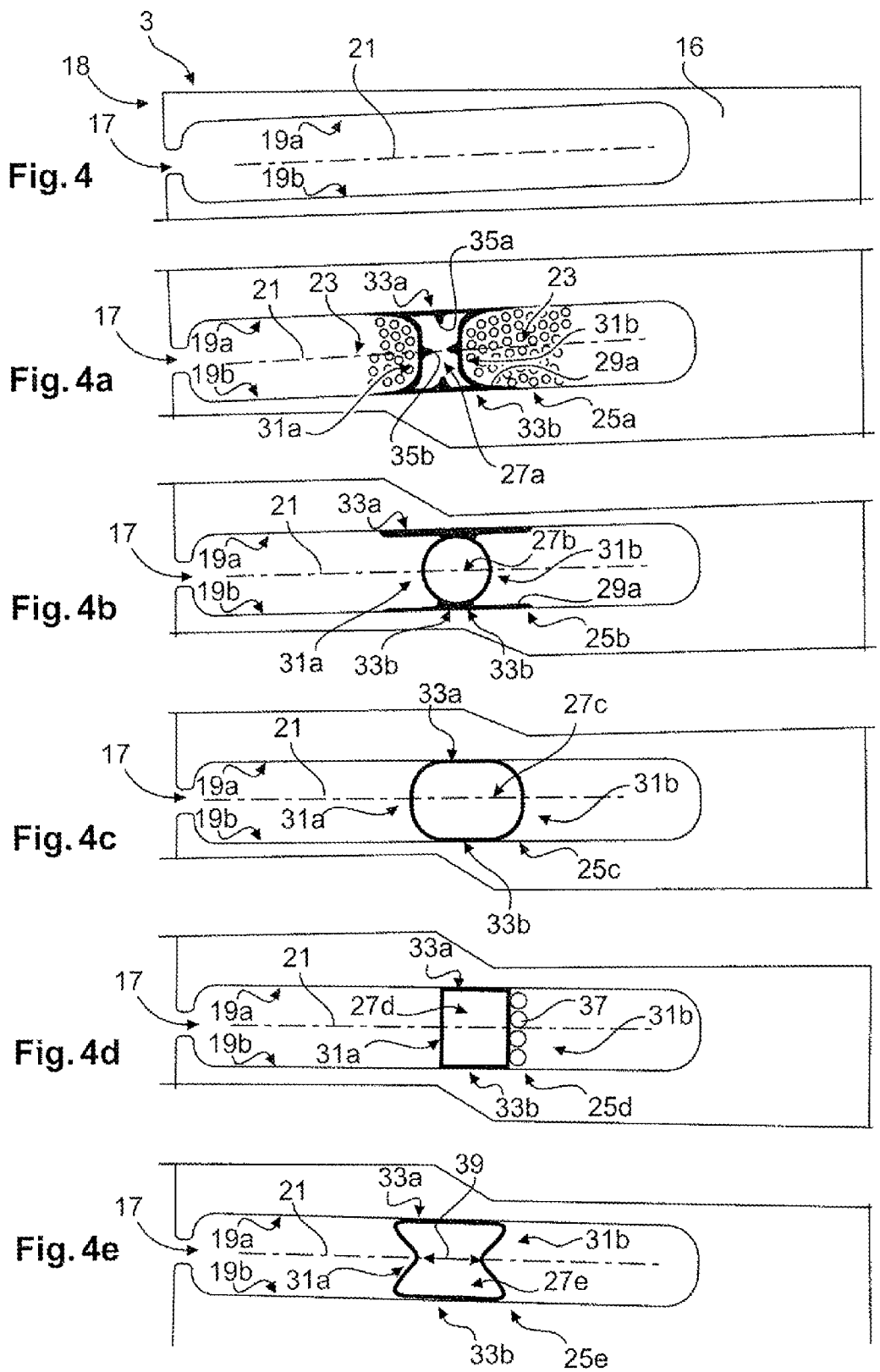

SYNCHRONOUS GENERATOR, IN PARTICULAR MULTIPOLE SYNCHRONOUS ANNULAR GENERATOR OF A DIRECT-DRIVE WIND TURBINE, AND WIND TURBINE HAVING THE SAME

BACKGROUND

Technical Field

The present invention relates to a synchronous generator, in particular a multipole synchronous annular generator of a direct-drive wind turbine. The present invention moreover relates to a wind turbine having such a synchronous generator.

Description of the Related Art

In the priority-establishing German application, a search made by the German Patent and Trademark Office identified the following documents: EP 2 752 578 A1, CH 357 797 A and DE 102 44 202 A1.

Wind turbines are generally known. They generate electricity from the wind by means of a generator. Modern direct-drive wind turbines often comprise a multipole synchronous annular generator with a large air gap diameter. The diameter of the air gap is hereby at least four meters and usually is as great as almost five meters. It is absolutely possible for synchronous generators composed of multiple parts to have air gap diameters in the region of ten meters or more.

The efficiency of the synchronous generator has a significant effect on the efficiency of the whole wind turbine when generating power. In order to achieve the highest possible degree of efficiency when generating power, it is therefore important for the stator winding to have an optimum design. This also includes in particular accommodating the highest possible number of bundles of wire in the stator winding.

The greater the thickness of the material of the stator winding, and the greater the induced field of the synchronous generator, the greater the amount of heat generated in the stator winding. It is inevitable that the stator winding and the stator ring of the synchronous generator are heated during operation. It is essential to prevent predetermined temperature limits from being exceeded in order to obviate, for example, impairment of the degree of efficiency or mechanical problems caused by the generation of heat and its transmission to adjoining components.

The generator, in particular the stator ring, accordingly needs to be cooled.

The cooling of the stator ring by means of external cooling means arranged at the circumference of the stator ring is, for example, known from the prior art.

Although this cooling method has been proven to be essentially reliable in practice, there is a requirement to improve the achievable cooling capacity at the synchronous generator of the wind turbine, and in particular at the stator ring.

BRIEF SUMMARY

A synchronous generator is proposed in particular which has a rotor and a stator, wherein the stator has multiple grooves in which a stator winding is arranged, wherein the stator winding releases heat energy as a result of the generation of power, and wherein a cooling body for absorbing and dissipating released heat energy is arranged in one groove, multiple grooves or all the grooves.

In the case of a synchronous annular generator of a direct-drive wind turbine, "multipole" is understood to mean multiple stator poles, in particular a design with at least 48 stator teeth, often even with considerably more stator teeth such as in particular 96 stator teeth or even more stator teeth. The magnetically active area of the generator, namely both the rotor and the stator, is arranged in an annular area about the axis of rotation of the synchronous generator. Thus in particular an area of 0 to at least 50 percent of the radius of the air gap contains no materials which conduct electricity or electrical field from the synchronous generator. In particular, this internal space is completely unobstructed and it is also in principle possible for staff to walk around within it. This area is often also more than 0 to 50 percent of the air gap radius, in particular up to 0 to 70 percent or even 0 to 80 percent of the air gap radius. Depending on the design, a support structure can be present in this inner area but in some embodiments it can be designed with an axial offset. Depending on their function, such synchronous generators of a direct-drive wind turbine are slowly rotating generators. Slowly rotating is here understood to mean, depending on the size of the turbine, a speed of less than 40 revolutions per minute, in particular between 4 and 35 revolutions per minute.

Optimum heat dissipation succeeds in the heat being absorbed directly where it is generated. In the present case, when electricity is generated in the synchronous generator, the heat is released in the stator windings. Absorbing the released heat occurs at a place which is as close as possible to the stator windings. In the past the fitting of a cooling body inside the groove which holds the stator winding was never taken into consideration because it contradicted the primary approach of providing as many bundles of wires as possible in a groove or the greatest possible packing density of the stator winding in the groove.

It has been proven that the presumed impairment of the generator efficiency owing to the "omission" of windings in favor of a cooling channel is compensated by the increased efficiency of a winding which is then cooler.

In an advantageous development, the cooling body has at least one winding contact surface which is in contact with the stator winding. The greater the winding contact surface, the greater too the transmission of heat between the stator winding and the cooling body.

The cooling body preferably has at least one wall contact surface which is contact with a groove wall. According to this preferred embodiment, by means of the cooling body it is additionally possible to actively cool the stator ring. It is also the case, with respect to the wall contact surface, that the amount of heat transmitted from the stator ring into the cooling body is greater the larger the wall contact surface.

In a preferred embodiment, the cooling body has a hollow body which is fluidically connected to a cooling medium circuit, wherein the hollow body has a wall with an inner and an outer side.

The cooling body preferably has a first wall contact surface, in contact with a first groove wall, and a second wall contact surface, in contact with a second groove wall opposite the first groove wall. The cooling body thus extends like a bridge completely from one groove wall to the next groove wall. In this embodiment, the cooling body preferably has not only two wall contact surfaces but also two winding contact surfaces, wherein the second winding contact surface is arranged on a side of the cooling body which is opposite the first winding contact surface.

In a preferred embodiment, the wall contact surface is formed at least partially by the outer side of the wall of the hollow body. Alternatively or additionally, the winding contact surface is formed at least partially by the outer side of the wall of the hollow body. These embodiments allow a structurally simple design of the hollow body.

In a further preferred embodiment, the cooling body has one or more projections which extend from the wall of the hollow body along the groove walls and have an outer side facing the respective groove wall, as well as an opposite inner side adjoining the stator winding. The wall contact surface is preferably formed at least partially by the outer side of the projections and the winding contact surface is formed at least partially by the inner side of the projections.

In a further preferred embodiment of the synchronous generator, the inner side of the wall of the hollow body has one or more cooling ribs. Owing to the enlarged contact surface between the cooling medium and hollow body, the cooling ribs generate a greater heat transfer to the cooling medium in comparison with the surface of the hollow body provided with ribs.

The hollow body can extend between the groove walls in the manner of a rectangle but can also have a surface which is enlarged in comparison with the rectangular shape, viewed from one groove wall towards the opposite groove wall. The hollow body preferably has a waisted design, or a bulge, in the radial direction of the groove. A waisted design is hereby understood to mean both a concave constriction and also an "angular" indentation with unrounded edges between surfaces. The same also applies, the other way round, for a bulge. Bulge is understood to mean both a convex curvature and an "angular" series of surfaces with no rounded edges. Such "angularly" bulging hollow bodies have an essentially polygonal shape in cross-section.

In a further aspect, a wind turbine, in particular a direct-drive wind turbine with a synchronous generator for generating electricity which is in particular designed as a multipole synchronous generator is provided.

Reference should be made to the above embodiments of the synchronous generator with respect to the advantages of the wind turbine.

In a still further aspect, is provided the use of a cooling body for absorbing and dissipating released heat energy. The cooling body is used to absorb and dissipate heat energy released from a stator winding of a synchronous generator according to one of the preferred embodiments described herein, wherein the cooling body is arranged in a groove of the synchronous generator.

The cooling body is preferably designed with the features of the cooling body of the abovedescribed synchronous generator. In this regard reference should also be made to the above embodiments of the synchronous generator according to the invention with respect to the advantages.

BRIEF DESCRIPTION OF THE SEVERAL VIEWS OF THE DRAWINGS

The invention is described below with reference to the attached drawings with the aid of multiple preferred exemplary embodiments. Identical or functionally similar features are hereby provided with identical reference numerals.

In the drawings:

FIG. 4 shows a partial view in section through the stator according to FIG. 3, and FIGS. 4a-e show different embodiments of a cooling body for use in a stator according to FIGS. 3 and 4.

DETAILED DESCRIPTION

Figure 1:
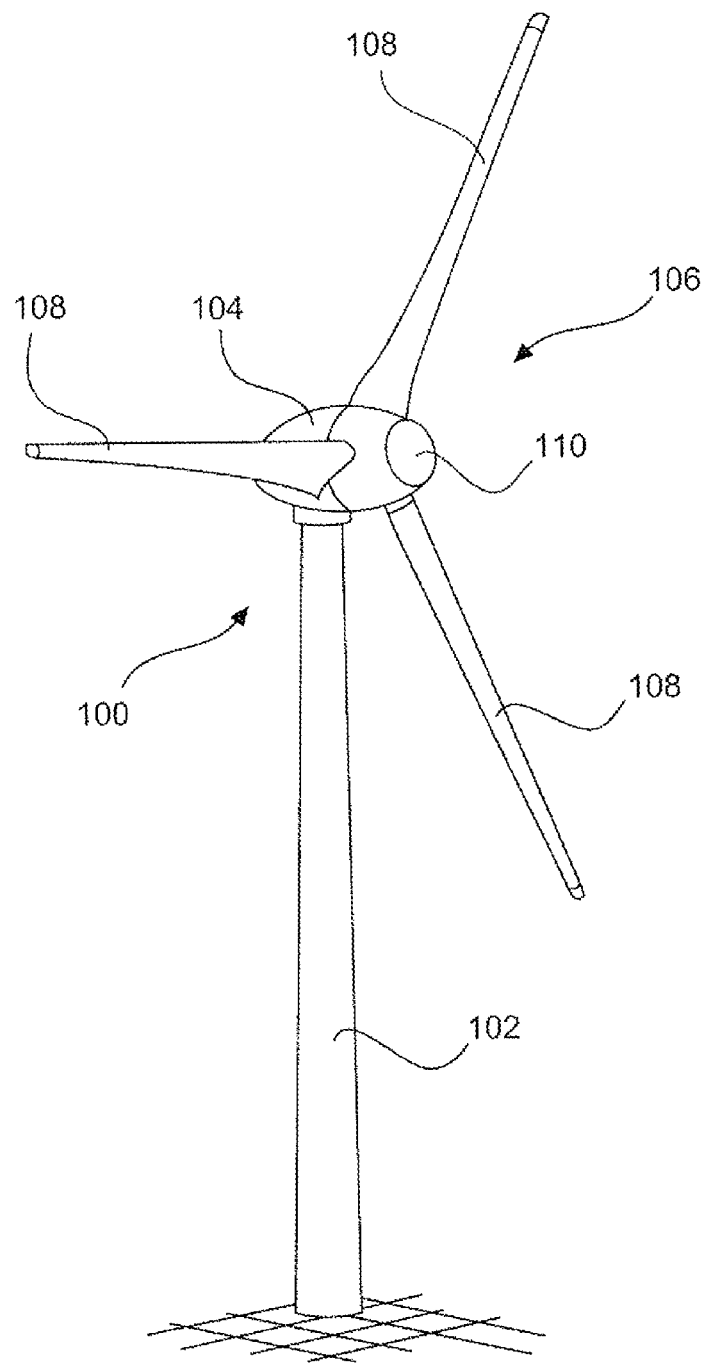
FIG. 1 shows a wind turbine schematically in a perspective view.

FIG. 1 shows a wind turbine 100 with a tower 102 and a nacelle 104. A rotor 106 with three rotor blades 108 and a spinner 110 is arranged on the nacelle 104. In operation, the rotor 106 is set in rotational movement by the wind and consequently drives a generator 1 (FIG. 2) in the nacelle 104.

Figure 2:
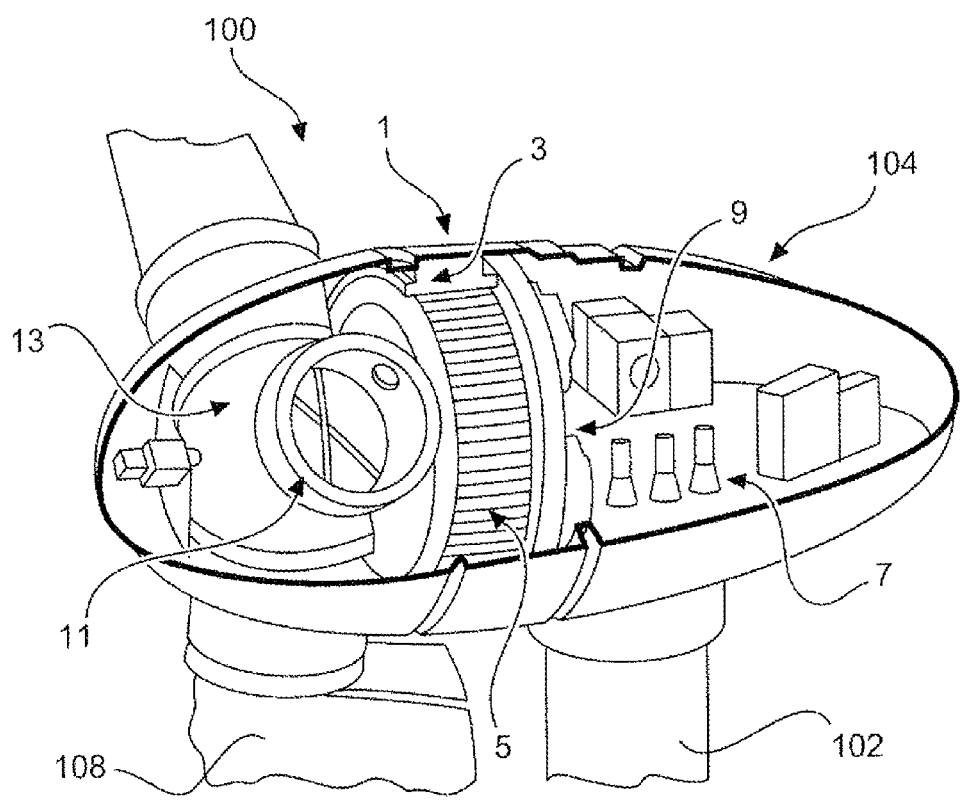
FIG. 2 shows a nacelle of the wind turbine according to FIG. 1 schematically in a perspective view in section.

The nacelle 104 is shown in FIG. 2. The nacelle 104 is mounted rotatably on the tower 102 and driven in a generally known manner by means of an azimuthal drive 7. In a further generally known manner, a machine frame 9, which holds a synchronous generator 1, is arranged in the nacelle 104. The synchronous generator 1 is designed and in particular is a slowly rotating, multipole synchronous annular generator. The synchronous generator 1 has a stator 3 and a rotor 5 which rotates inside it. The rotor 5 is connected to a rotor hub 13 which transmits the rotational movement of the rotor blades 108 caused by the wind to the synchronous generator 1.

Figure 3:
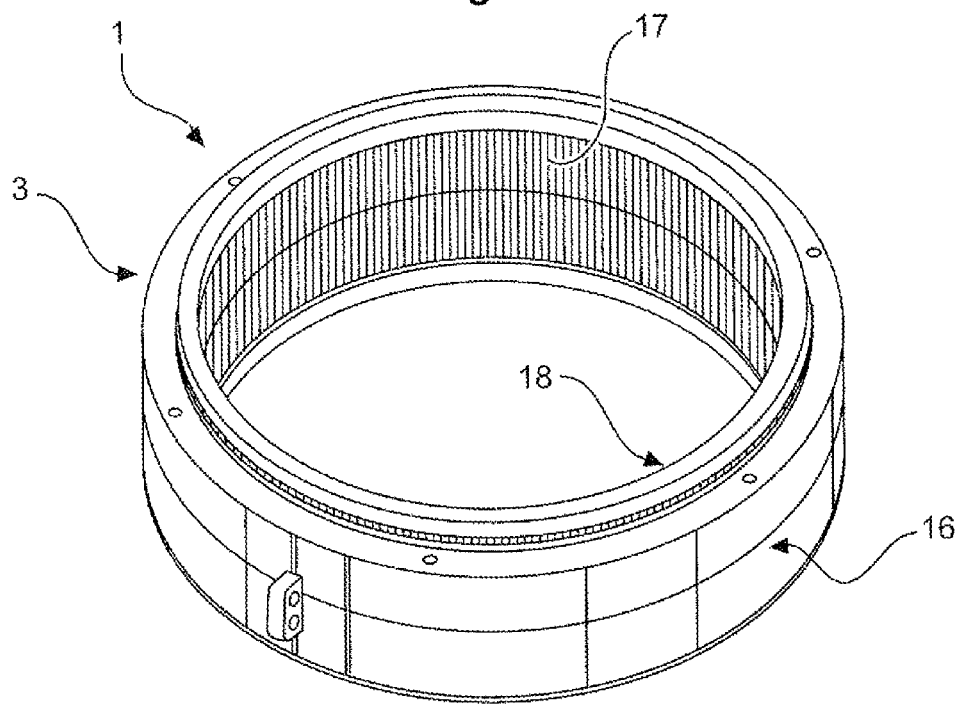
FIG. 3 shows a simplified schematic perspective view of a stator of the wind turbine according to FIGS. 1 and 2.

FIG. 3 shows the stator 3 on its own. The stator 3 has a stator ring 16 with an internal circumferential area 18. Multiple grooves 17 are provided in the internal circumferential area 18 which are designed to receive the stator winding in the form of bundles of wires.

FIG. 4 shows a view in cross-section through a groove 17 of the stator ring 16. The groove extends in an essentially radial direction along a groove axis 21. The groove 17 has a first groove wall 19a and a second groove wall 19b opposite the first groove wall.

Different embodiments of a cooling body 25a-e for the synchronous generator 1, each arranged in one of the grooves 17, are shown in FIGS. 4a-e.

The cooling body 25a shown in FIG. 4a is, as is apparent from its external contour, designed essentially in the shape of a curved x. The cooling body 25a has a first ending contact surface 31a and a second winding contact surface 31b which are in contact with a stator winding 23. This also applies for the winding contact surface 31a,b of the cooling body 25b-e from FIGS. 4b-e in which, however, the stator winding 23 has not been shown for greater clarity.

The cooling body 25a also has a first wall contact surface 33a and a second wall contact surface 33b which each extend along the groove walls 19a+b and bear against them. According to FIG. 4a, the wall contact surfaces 33a,b are formed partially by the outer side of the wall of the hollow body 27a. According to FIG. 4a, the cooling body 25a also has multiple projections 29a, one of which is provided with a reference numeral for the sake of clarity. The projections extend from the wall of the hollow body 27a along the groove walls 19a,b. An outer side of the projections 29a also forms part of the wall contact surface 33a,b, whilst an inner side of the projections 29a in each case forms part of the winding contact surface 31a,b of the cooling body 25a. The total surface area of the cooling body 25a is increased as a result.

The inner side of the wall of the hollow body 27a has multiple cooling ribs 35a,b which each serve to increase the surface area of the wall of the hollow body 27a.

The hollow body 25a has a waisted design or has concave constrictions on both sides in the direction of the groove 17 or in the direction of the groove axis 21.

The cooling body 25b shown in FIG. 4b is structurally similar to the cooling head 25a from FIG. 4a in as much as it has a hollow body 27*b* and multiple projections 29*b* extending from the hollow body 27*b*, wherein the wall contact surface 33*a,b* is in each case formed partially by the outer side of the wall of the hollow body 27*b* and by the outer side of the projections 29*b*. The winding contact surface is likewise partially formed by the outer side of the wall of the hollow body 27*b* and by the inner sides of the projections 29*b*.

In contrast to the cooling body 25*a*, the hollow body 27*b* of the cooling body 25*b* is designed as an essentially cylindrical tube on the outside of which the projections are arranged tangentially. The hollow body 27*b* has a bulbous shape in the direction of the grove axis 21, i.e., thus has a bulge.

The cooling body 25*c* from FIG. 4*c* is formed with an essentially oval cross-section and has, at the sides facing the groove walls 19*a,b*, an uncurved outer wall portion which bears against the groove walls 19*a,b* and forms the wall contact surfaces 33*a,b* of the cooling body 25*c*. In contrast to FIGS. 4*a,b*, the cooling body 25*c* does not have any projections. However, like the cooling body 25*b* according to FIG. 4*b*, it has a bulbous shape in the radial direction or in the direction of the groove axis 21, and thus has a bulge or is bulged convexly on both sides.

The cooling body 25*d* shown in FIG. 4*d* has a hollow body 27*d* which has an essentially rectangular profile in cross-section. The winding contact surfaces 31*a,b* extend essentially over the shortest distance from one groove wall 19*a* to the opposite groove wall 19*b*, from where in each case the wall contact surface 33*a,b*, in the form of the outer side of the wall of the hollow body 27*d*, extends along the groove walls 19*a,b*.

Indicative cross-sections of winding wires are labelled with the reference numeral 37.

The cooling body 27*d* neither has a waisted design nor has a bulbous bulge.

FIG. 4*e* lastly shows a cooling body 25*e* which, like the cooling bodies 25*c,d* in FIGS. 4*c,d*, has no projections such that the wall contact surfaces 33*a,b* are formed completely by the outside of the wall of the hollow body 27*e*. The essentially polygonal cross-section of the hollow body 27*e* is constricted in the direction of the arrows 39 which preferably lie on the groove axis 21, so that a waisted design is formed. The latter can be designed with rounded corners, as in the example shown in FIG. 4*e*, or alternatively with angular corners so that a double trapezium is formed which has the groove axis 21 as its axis of symmetry.

Although the cooling bodies 25*c,d,e* are formed with no projections in the exemplary embodiments shown, it is nevertheless within the scope of the invention also to provide these cooling bodies with projections, and it is equally within the scope of the invention to provide cooling bodies which essentially have the same structural design as the cooling bodies 25*a,b* in FIGS. 4*a,b* but with no projections.

It is likewise within the scope of the invention that the cooling bodies in FIGS. 4*b-e* each have one or more cooling ribs on the inside of the wall of the hollow bodies 27*b-e*.

Also within the scope of the invention are cross-sectional profiles in which a first winding contact surface is bulged bulbously and the opposite second winding contact surface is constricted, or alternatively is neither bulged nor constricted. Likewise within the scope of the invention are cross-sectional profiles in which only one winding contact surface is provided with a waisted design, i.e., is pressed inwards in the direction of the inside of the hollow body, whilst the opposite second winding contact surface is designed as straight, i.e., is neither bulged nor waisted.

Where it is advantageous for the respective application, multiple or all grooves of the stator ring 16 have an identical cooling body 25*a-e* but alternatively different cooling body geometries 25*a-e* are provided for the stator ring 16 for different groups of grooves 17.

Other preferred embodiments can be derived from different combinations of the following patent claims.

The invention claimed is:

1. A synchronous generator of a direct-drive wind turbine for generating electricity, the synchronous generator comprising:
   a rotor and a stator, the stator having a plurality of grooves, a stator winding arranged in the plurality of grooves, wherein the stator winding releases heat energy as a result of the generation of power, and
   a cooling body for absorbing and dissipating the released heat energy arranged in at least one of the plurality of grooves, wherein the cooling body has a first wall contact surface in contact with a first groove wall, and a second wall contact surface in contact with a second groove wall opposite the first groove wall, wherein the cooling body has a hollow body having a wall with an inner side and an outer side, wherein the cooling body has a winding contact surface; and
   wherein the cooling body has one or more projections extending from the wall of the hollow body along the first and second groove walls, and has an outer side facing the respective one of the first and second groove walls, as well as an opposite inner side adjoining the stator winding, wherein the first and second wall contact surfaces are formed at least partially by the outer side of the projections, and wherein the winding contact surface is formed at least partially by the inner side of the projections.

2. The synchronous generator according to claim 1, wherein the winding contact surface is in contact with the stator winding.

3. The synchronous generator according to claim 1, wherein the hollow body is fluidically connected to a cooling medium circuit.

4. The synchronous generator according to claim 1, wherein the first and second wall contact surfaces are formed at least partially by the outer side of the wall of the hollow body.

5. The synchronous generator according to claim 1, wherein the winding contact surface is formed at least partially by the outer side of the wall of the hollow body.

6. The synchronous generator according to claim 1, wherein the inner side of the wall of the hollow body has one or more cooling ribs.

7. The synchronous generator according to claim 1, wherein the hollow body has a concave shape in a radial direction of the groove.

8. The synchronous generator according to claim 1, wherein the hollow body has a bulge in a radial direction of the groove.

9. A wind turbine comprising:
   a synchronous generator for generating electricity, wherein the synchronous generator is the synchronous generator according to claim 1.

10. The wind turbine according to claim 9, wherein the cooling body is arranged in a groove of the synchronous generator, wherein the cooling body is configured to absorb and dissipate released heat energy from the stator winding of the synchronous generator.

11. The wind turbine according to claim 9, wherein the wind turbine is a direct-drive wind turbine.

12. The wind turbine according to claim 9, wherein the synchronous generator is a multipole synchronous generator.

13. The synchronous generator according to claim 1, wherein the synchronous generator is a multipole synchronous annular generator of a direct-drive wind turbine.

* * * * *